United States Patent [19]

Sharma

[11] Patent Number: 4,619,831

[45] Date of Patent: Oct. 28, 1986

[54] DIETARY FIBER COMPOSITION AND PROCESS OF MANUFACTURE

[75] Inventor: Shri C. Sharma, Mendham, N.J.

[73] Assignee: Warner-Lambert Company, Morris Plains, N.J.

[21] Appl. No.: 616,993

[22] Filed: Jun. 4, 1984

[51] Int. Cl.$^4$ ............................................. A23L 1/29
[52] U.S. Cl. .................... 426/93; 426/104; 426/302; 426/804
[58] Field of Search ............... 426/93, 96, 104, 302, 426/804

[56] References Cited

U.S. PATENT DOCUMENTS

| B 495,489 | 2/1976 | Chen .................. 426/93 X |
| 2,339,418 | 1/1944 | McKay .................. 426/93 |
| 3,023,104 | 2/1962 | Battista . |
| 3,780,195 | 12/1973 | Balassa .................. 426/96 |
| 3,917,861 | 11/1975 | Viera et al. . |
| 4,056,636 | 11/1977 | Muller . |
| 4,065,578 | 12/1977 | Reggio et al. . |
| 4,089,981 | 5/1978 | Richardson . |
| 4,143,163 | 3/1979 | Hutchison et al. .................. 426/96 |
| 4,315,954 | 2/1982 | Kuipers et al. . |
| 4,348,379 | 9/1982 | Kowalsky et al. . |
| 4,386,108 | 5/1983 | Richter .................. 426/93 |
| 4,407,841 | 10/1983 | Boocock et al. . |
| 4,451,488 | 5/1984 | Cook et al. . |

OTHER PUBLICATIONS

Spiller, G. A., et al., "Fiber in Human Nutrition", Plenum Press, N.Y., 1976, pp. 99–101.

*Primary Examiner*—Robert Yoncoskie
*Attorney, Agent, or Firm*—Daniel A. Scola, Jr.; Gary M. Nath

[57] ABSTRACT

A dietary fiber composition is prepared by coating an insoluble fiber with a soluble fiber. The insoluble fiber is preferably derived from cereal bran by enzymatically and chemically purifying the bran. The soluble fiber is preferably pectin or an alginate. The dietary fiber composition can be used to prepare low calorie, high fiber content dietary food products.

The process of preparing the dietary food composition and the food products made therefrom is also disclosed.

15 Claims, 1 Drawing Figure

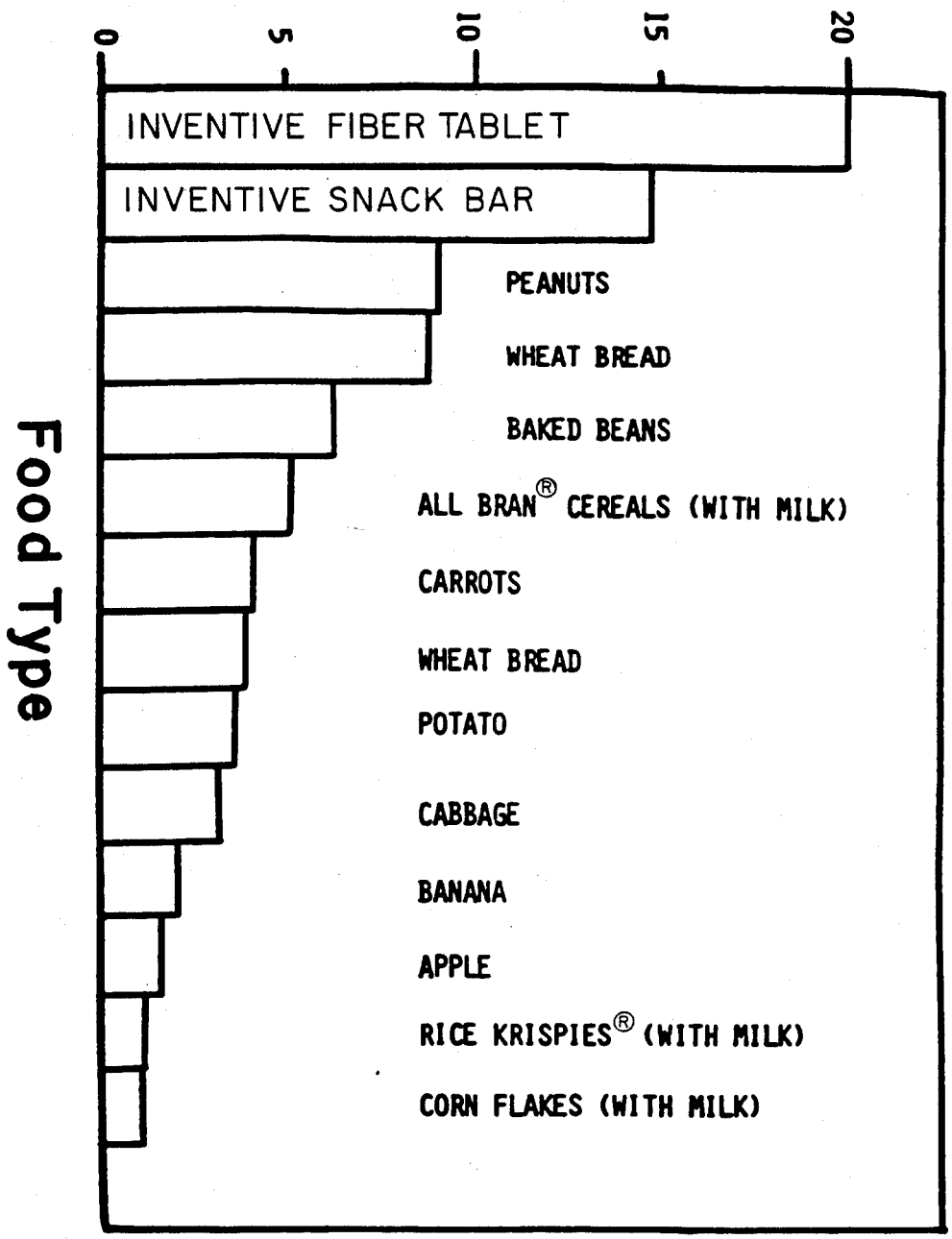

DIETARY FIBER COMPOSITION AND PROCESS OF MANUFACTURE

FIELD OF THE INVENTION

This invention relates to a dietary fiber product. In particular it relates to a process of preparing a dietary fiber source and edible products using the fiber.

BACKGROUND OF THE INVENTION

Since the 1970's there has been a heightened awareness of the benefits of dietary fiber. Consequently, consumers have shown an increasing interest in high fiber food products. These food products have included breakfast cereals, laxative beverages, bran tablets and cereal bars with added bran fiber.

Numerous snack-food products are available for consumption in the form of cereals, granola-type bars and cookies. These products have become readily acceptable to consumers, particularly for those interested in foods containing grains and fruits. "Snack meals" have become an important substitution for traditional meals and the nutritional contribution of the former has therefore become increasingly important. For the most part, the products of the prior art have concentrated on the utilization of cereal proteins.

German Federal Republic Patent Application No. 2,746,479, filed 1979, to Bayer AG, concerns confectionery bars such as chocolate bonbons, etc., whereby shredded bran or vegetable fiber is added in the amount of 5-75% by weight.

It is known to use fibrous materials such as wheat bran and cellulose for a variety of baked and cooked products. U.S. Pat. No. 4,175,448 to Hayward et al. discloses a cereal protein fortified bar. U.S. Pat. Nos. 4,056,636 to Kelly et al., 3,903,308 to Ode, 3,925,567 to Able, 3,711,296 assigned to Beatrice Foods, U.K. Pat. No. 1,321,889 to National Biscuit Co., U.S. Pat. No. 3,532,509 to Gronberg and U.S. Pat. No. 3,540,890 to Benson are among the relevant patents dealing with snack foods and cereal containing products in snack food form. These are cited primarily as background for the examiner.

Dietary fiber (bran-cellulose) in cookie products is discussed in the journal "Tennessee Farm and Home Science," 1979, No. 101, 21-24. This product concerned a dough which was baked. The "Journal of Food Science," 1979, 42, (6), 1428-1431 discusses the feasibility of increasing fiber with cellulose in cakes. A high-protein snack food using beanstalk (mungbean flour) with sesame seed and rice bran products is discussed in the "Thai Journal of Agriculture Science," 1974, 7, (2), 93-101.

A high protein food bar consisting of peanuts and grains bound together by peanut butter and sweeteners, which is then extruded and cut in bar shape and coated with carob is disclosed in "Food Product Development," 1981, 15, (3), 30. Its ingredients are peanut butter, cornsweet 90, carob coating, 62 DE corn syrup, soy bran, peanuts, isolated vegetable protein, wheat germ, natural vanilla flavoring, lecithin and is fortified to greater than or equal to 60% of the U.S. RDA for proteins, vitamins and minerals.

German Federal Republic Patent Application No. 2,845,571, 1980 discloses snacks rich in cellulose fiber wherein 10-20% moisture may be present and 10-80% of a filler consisting of bran, pure cellulose or other plant residue and 20-90% of a protein such as milk protein.

U.S. Pat. No. 3,917,861 to Viera et al., discloses a process for producing a breakfast cereal using delicate belt compaction to bond cereal particles together with a binder fat.

U.S. Pat. No. 4,304,7 to Staub et al., discloses a low-calorie food product containing dietary fiber present, at the level of ¼ to 2 times the level of polyols present, the purpose of the fiber being the reduction of diarrhea which ordinarily occurs with the use of polyol sweeteners. The products contemplated are baked goods, jams, pastas, noodles, toppings and confections.

U.S. Pat. No. 4,038,427, to Martin, discloses a snack food product produced by aggregating an assortment of amylaceous and proteinaceous particles around puffed and preferably at least partially puffed toasted cereal flakes which serve as focal points for the particles and thereby afford a multi-textured lower density and eating quality, the aggregates being preserved and agglomerated in a fat-syrup double or single coating. The preferred ingredients are coconut oil 10 to 20%, rolled oats 20 to 35%, wheat germ 0 to 25%, rolled whole wheat 2 to 25%, corn syrup 0 to 5% and oven-puffed rice flakes 0 to 25%. The products are intended to be of the granola-type and are prepared by spraying an aqueous solution of sugar onto oil coated wheat and oats. The initial individual moisture content of the wheat and oats is 8%. The particles subsequent to oil coating have a moisture content of 13% and are later dried to again reduce their moisture content to 6 to 8%.

U.S. Pat. No. 3,876,811 to Bonner et al., discloses a ready-to-eat cereal of natural ingredients consisting essentially of a base and a coating thereon, said base comprising 30 to 50 parts by weight cereal flakes, 5 to 8 parts coconut, 0 to 10 parts milk solids and 5 to 9 parts edible nuts; said coating comprising 12 to 24 parts brown sugar, 5 to 15 parts non-hydrogenated vegetable oil, ½ to 3 parts sugar; said cereal having a moisture content of 1 to 3½% by weight and a density of 0.15 to 0.35 oz. per cubic inch. The process of making this product requires oven drying to reduce moisture content subsequent to the addition of 1 to 3% by weight of water.

U.S. Pat. No. 4,315,954 to Knupers et al., concerns a dietary snack product rich in fiber produced by a process wherein a fiber-containing substance which is difficult to extrude by itself is mixed with a protein such as milk and water, to form a mixture having a moisture content between 8 and 25%, the mixture then being extruded at a temperature of at least 100° C. The resulting dietary product may contain 10 to 80% rich in fiber such as bran and 20 to 90% of plastifiable protein.

U.S. Pat. No. 3,868,471, discloses ready-to-eat cereals produced by coating a mixture of a raw cereal base and additional cereal grains with an edible oil, and permitting the oil to penetrate the cereal surface. A syrup coating is then applied, while agitating, to form clusters having a substantially continuous double film thereon. The clusters are then roasted and dried.

U.S. Pat. No. 4,143,163, to Hutchison, discloses an edible fibrous cellulose product encapsulated in a polyhydric alcohol and gum solution to produce a low calorie gum base product for use in the manufacture of foods.

Breads, cereals, cakes and beverage mixes are known in the art to include what is commonly referred to as dietary fiber. These products have in common with those previously discussed the requirement of traditional baking, cooking, toasting, frying or other heat treatments to arrive at a desired product form and taste.

Generally, the objective of the foregoing prior art is to attempt to conceal the unpleasant taste and texture of fiber in various components including fats, polyhydric alcohols, sugar solids or starch. While the objective is achieved to some degree, it is at the expense of a significant increase in caloric value of the product. Furthermore, the effective "dose" of fiber is substantially diluted.

The term "dietary fiber" is commonly understood to mean that component of food which is non-digestible and non-metabolizable by humans. It is well known that dietary fibers as they occur naturally in food sources also have associated with them a digestible portion comprising fats, proteins and carbohydrates. Additionally, in many foods containing dietary fiber, significant portions of the foods by weight are usually digestible portions which are caloric in nature. Thus, presently to obtain a high weight percent content of dietary fiber, it is necessary to eat large quantities of a fiber-containing food source, such as cereal brans. A significant disadvantage in doing this is that one simultaneously consumes extremely high amounts of fats, proteins and carbohydrate materials which, being digestible, contribute to caloric intake.

The instant invention solves the problems of the prior art by making a composition whereby the weight ratio of dietary fiber to digestible material is increased to allow for consumption of high percentages of dietary fiber without the disadvantage of high caloric intake. The compositions of the instant invention are improved over the prior art attempts to mask the fibrous, rough mouthfeel texture of dietary fiber. Whereas the prior art masked the unpleasant fiber taste with fats and carbohydrates, the instant invention uses soluble dietary fiber to coat insoluble dietary fiber.

Thus, the instant invention provides novel dietary fiber compositions and food products containing the dietary fiber compositions. This invention also concerns a novel process for making the dietary fiber composition and food products made therefrom.

SUMMARY OF THE INVENTION

This invention relates to a dietary fiber composition low in caloric value, comprising insoluble dietary fiber coated or enrobed with a soluble dietary fiber. The insoluble fiber is chemically and enzymatically purified to provide a concentrated source of insoluble dietary fiber. The concentrated insoluble dietary fiber is then coated or enrobed with a soluble dietary fiber to provide a smooth, non-fibrous texture and mouthfeel. The dietary fiber products of this invention can be incorporated into a variety of food products to supply a high dietary fiber content with an organoleptically pleasing taste and mouthfeel and without the high caloric value of the prior art fiber products.

Additionally this invention relates to a process of making the dietary fiber composition comprising the steps of chemically and enzymatically purifying the dietary fiber to extract the digestible portions whereby concentrated insoluble dietary fiber remains; coating or enrobing the concentrated insoluble dietary fiber with a soluble dietary fiber in a carrier material; and drying the composition to obtain a dietary fiber composition having a smooth-tasting texture and non-fibrous mouthfeel.

DETAILED DESCRIPTION

This dietary fiber composition comprises about 92% to about 98.5% by weight of the concentrated insoluble dietary fiber which is coated or enrobed with about 1.5% to about 8% by weight of soluble dietary fiber. These percentages are based on the total dry weight of the composition. The final form of the dietary fiber composition of this invention is a solid, powdery, particulate material.

As previously mentioned, the term "dietary fiber" is commonly understood to mean that component of food which is non-digestible and non-metabolizable by humans. For purposes of this invention, this definition of dietary fiber will be used.

Dietary fiber can be divided into two broad categories: insoluble dietary fiber and water soluble dietary fiber. For purposes of this invention the commonly known definitions of these two categories of dietary fiber will be also used. Accordingly, "insoluble dietary fiber" means insoluble, substantially non-swellable dietary fiber. "Soluble dietary fiber" means dietary fiber which is water soluble or water swellable. Soluble dietary fiber provides the bulking effect commonly associated with fibers.

It is critical to the invention that the insoluble dietary fiber of the instant invention be in concentrated form, e.g., be purified such that any residual digestible portion comprising fats, proteins and carbohydrates be removed, leaving behind concentrated insoluble fiber such as, from a grain, cereal or bran source. The removal of these digestible portions associated with the fiber, although relatively small by weight, also eliminates any caloric-contributing components of the insoluble fiber.

It is important that the food sources chosen for the insoluble dietary fiber be one which naturally contains a relatively high percentage of insoluble fiber such that when the process of the instant invention is carried out, a high yield of concentrated insoluble fiber is obtained. Thus, while a wide range of food sources containing insoluble dietary fiber may be useful in the invention, those which are best suited for the invention are cereal brans and mixtures thereof, due to their relatively high of insoluble dietary fiber content. Those cereal brans useful in this invention are selected from the group consisting of wheat, corn, barley, rye oats and mixtures thereof. Wheat and corn bran are the most preferred. The components of the insoluble dietary fiber derived from these cereal brans are known to be cellulose, hemicellulose and lignin. Thus, the concentrated insoluble fiber of the instant invention will comprise one or more of these components.

The soluble dietary fibers useful in the invention must be film-forming hydrocolloid materials selected from the group consisting of alginates, gums, pectin, mucillages and similar plant exudates and mixtures thereof. This requirement is critical to the invention since the soluble fibers are to be used as coatings for the insoluble fiber.

It is also critical for certain soluble fibers, such as pectin, that the film-forming characteristics of the soluble fiber be controllable, e.g., by controlling the pH of the aqueous mixture and thereby maintaining stability of the soluble fiber gel. Buffers are employed, e.g., a citric acid, sodium citrate buffer, to aid in stability control of the soluble fiber in aqueous solution. Examples of useful soluble fibers are arabic, tragacanth, karaya, ghatti, seaweed extracts including agar, alginates, carrageenans and fucellan; pectin; and mucillages such as psyllium.

In addition to these naturally occurring soluble dietary fibers, biosynthetic or fermentation products such as dextran, xanthan and curdan are useful. Additionally, chemically modified materials may also be used in this invention and include carboxymethyl cellulose, methylcellulose, hydroxypropylcellulose, hydroxypropylmethyl cellulose, low methoxy pectin and propylene glycol alginate. Synthetic products including polyvinylpyrrolidone, carboxyvinyl polymers and polyethylene oxide polymers are also suitable soluble fibers for the purpose of this invention.

The process of making the fiber compositions of this invention uses a known analytical technique to remove the digestible portion of the insoluble fiber. While the analytical method for separating the digestible portion of the dietary fiber from the indigestible portion is known, no art has disclosed the utilization of this technique in the process of making a dietary fiber composition.

When an analysis of the dietary fiber content in a food is to be determined analytically, it is necessary to remove the digestible, non-dietary fiber material and recover the dietary fiber. A technique for this analytical method is disclosed in the association of analytical chemists publication "Total Dietary Fiber: AOAC Collaborative Study, Jan. 25, 1982" incorporated herein by reference. This technique utilizes enzymatic and chemical procedures to isolate the dietary fiber. When a wheat bran or corn bran for example, is treated according to this AOAC method the recoverable dietary fiber is an insoluble fiber. The bran is first treated with a solvent, e.g., petroleum ether or hexane, to remove the fat. The defatted bran is then digested enzymatically with protease. Finally, the bran is treated with $\alpha$-amylase or bamylose and amyloglucosidase. The recoverable material is protein-free, fat-free and carbohydrate-free insoluble dietary fiber. Thus the recovered material is essentially non-digestible fiber, free of any association or residue of digestibles.

More specifically, the process of this instant invention involves the steps of:

(a) removing the digestible portions of the insoluble dietary fiber of a cereal bran whereby a solvent is used to chemically defat the insoluble dietary fiber; and subsequently treating the defatted fiber enzymatically to remove protein and carbohydrates;

(b) recovering the concentrated non-digestible portion of the insoluble fiber;

(c) coating or enrobing the non-digestible portion of the insoluble fiber with a soluble dietary fiber using an aqueous medium;

(d) removing excess water by drying to yield the coated fiber composition.

Organoleptically, the insoluble fiber by itself is unacceptable both from the taste and texture standpoints. It is necessary to coat the fiber in a manner which masks these undesirable characteristics. As described above, the prior art techniques have focused on coating fiber with non-fiber components, e.g., with fats and carbohydrates. A major disadvantage of the prior art is the high calories associated with the coating materials. As seen above, the practice of this invention involves coating an insoluble dietary fiber having the digestible portions removed therefrom, with a soluble dietary fiber. The result is a dietary fiber composition or product which has a smooth, non-fibrous texture without having associated with it the caloric components (carbohydrates, fats and proteins) of the prior art. Although the soluble dietary fiber coating may contain a digestible portion comprising fats and carbohydrates, they are present in minute amounts as only residual components of the fiber, and the caloric value of the coating and subsequently the coated composition, is therefore insignificant.

The fat portions of the insoluble fiber are removed by extraction with a solvent such as petroleum ether or hexane. The resultant defatted insoluble fiber is then treated enzymatically with protease to remove protein and then with termamyl (heat stable $\alpha$ or $\beta$ amylase) and amyloglucosidase to remove carbohydrates.

The insoluble fiber is defatted by placing the fiber sample in a beaker with the solvent and stirring for about 15 minutes. The mixture is then allowed to stand at room temperature for about one minute and the solvent decanted off. These steps are repeated at least twice. Approximately 25 ml of solvent is used for every 10 grams of fiber sample. After the solvent is decanted, the fiber is then oven or air dried.

The dried defatted fiber is then mixed in a container with a buffer solution, e.g., a phosphate buffer solution with pH about 6.0, and termamyl solution and the container is placed in boiling water both for about 15 minutes, with light agitation at 5 minute intervals. The mixture is then cooled and its pH is adjusted to about $7.5 \pm 0.1$ through the addition of 0.285N NaOH solution. Protease is then added and the mixture is incubated at 60° C. for 30 minutes with continuous agitation. The mixture is then cooled and the pH is adjusted with acid (e.g., phosphoric and solution) to about $4.5 \pm 0.2$. Amyloglucosidase is then added and the solution mixture is incubated at 60° C. for 30 minutes with continuous agitation. Next, 95% ethyl alcohol is added. The enzyme digest is then filtered off and the residue is washed first with ethyl alcohol and then with acetone and subsequently dried, preferably in a vacuum oven or an air oven.

The insoluble non-digestible portion is then recovered, dried and coated with soluble dietary fiber. The coating procedure can be a simple mixing process whereby the insoluble and soluble fibers are mixed in a pot using water as a carrier and mixing aid. The mixture would then be spread out to dry and subsequently used in a food product. Additionally, other known coating procedures are useful, such as fluidized bed granulation coating whereby coating and drying takes place in one process.

The coating process requires the use of water as the carrier and mixing aid. While moisture is necessary during the coating process, it should be substantially removed from the coated fibers once the coating process is complete. This can be accomplished by common drying techniques such as air drying, oven drying, vacuum drying and the like.

The dietary fiber compositions of this invention can be incorporated into a variety of foods intended to provide high dietary fiber content with low caloric value. For example, snack foods such as candy bars, gelatin tablets and fruit rolls and the like are among the food products which can be prepared using the dietary fiber composition. Food products should contain the dietary fiber of the instant invention in amounts of about 10% to about 40%, preferably about 10% to about 30% by weight and most preferably in amounts of about 15% to about 25% of the total food product. These food products do not suffer from the high caloric content as the prior art products since the fibrous mouthfeed is masked with dietary fiber coating rather than the traditional fat and carbohydrate coating.

Surprisingly, it has been found that in preparing food products using the dietary fiber composition of the instant invention, the coating of the insoluble fiber with the soluble fiber can be also accomplished as an integral step of making the food product itself and need not be carried out as a separate, distinct step. It has been discovered that during the mixing of the ingredients of a food product, e.g., a candy bar or gelatin tablet, the soluble and insoluble fiber can be mixed along with the other ingredients there being sufficient intimate contact between the soluble and insoluble fiber such that the coating effect is accomplished. Thus, when using the dietary fiber composition of this invention, the insoluble fibers need not be first coated with the soluble fiber and then added to the ingredients of the food product, but can be added as individual components along with the other ingredients in admixture and formed into a final food product, such as a bar or table, for consumption. The process is discussed in more detail below.

The food products of this invention, in addition to containing the novel dietary fiber composition, contain various common confectionery ingredients such as flavors and flavoring agents, fillers, coloring, bulking agents, emulsifiers and the like, and including the addition of pieces of natural nuts and dried fruit. The food product must comprise at least 10% to about 40% of the dietary fiber composition, preferably about 10% about 30%, and most preferably about 12% to 18% by weight and at least one sweetener and one flavor. The dietary fiber present in the food products comprises about 9% to about 37% insoluble fiber and preferably about 1% to about 3% soluble fiber by weight of the food product. While a natural final product is preferred, synthetic sweeteners and flavors or flavoring agents are useful in reducing the total caloric value of the food composition.

As seen in FIG. 1, the food products of the instant invention have a significantly higher amount of dietary fiber than those commonly consumed fiber-containing products as shown. The inventive tablet, containing about 20 grams of dietary fiber per 100 grams of total food product, corresponds to Examples 1, 2, 3 and 4. The inventive snack bar, containing about 15 grams of dietary fiber per 100 grams of total food product corresponds to Examples 7, 8 and 9. The significance of this graph is two-fold. First, it demonstrates that the inventive fiber-containing products contain more concentrated fiber than the commonly consumed products of the prior art, including many natural fruits and vegetables as well as bread and bran-containing cereals. This is due to the instant invention's unique fiber composition (purified insoluble fiber coated with soluble fiber) and process of incorporating it into a final food product. The inventive food products have a smooth texture without any of the fibrous, needle-like mouthfeel of the prior art.

The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

While the flavor of the dietary food product of this invention is preferably derived from fruits flavoring agents can be used as a source of flavor.

These flavoring agents may be chosen from synthetic flavor oils and flavoring aromatics, and/or oils, oleo resins and natural extracts derived from plants, leaves, flowers, fruits and so forth, and combinations thereof. These flavoring agents are generally liquids. However, they can also be used as spray dried solids. These spray dried solids can be prepared by dissolving or dispersing the flavoring agent in a water solution of maltodextrin and spray dried. The flavoring agent is adsorbed into the maltodextrin. The use of flavoring agents having other distinct physical forms such as powdered flavorings, beaded flavorings and encapsulated flavorings, all of which are within the scope of this invention. Illustrative non-limiting examples of flavoring oils include spearmint oil, cinnamon oil, oil of wintergreen (methylsalicylate) and peppermint oils. Synthetic and natural fruit flavors are also useful as flavoring agents including such flavorings as citrus oil, e.g., lemon, orange, lime and grapefruit; fruit essences including apple, strawberry, cherry, pineapple and banana; and various flavorings such as aldehydes and esters including cinnamyl acetate, cinnamaldehyde, citral diethyl acetal, dihydrocavryl acetate, eugenyl formate p-methylamisol, etc. Generally any flavoring or food additives such as those described in *Chemicals Used In Food Processing*, pub 1274 by the National Academy of Sciences, pages 49–53 and 63–258 may be used.

The amount of sweetener utilized will depend upon the desired taste effect and is primarily a matter of preference. Generally about 40 to about 60% by weight of the total food product is used and preferably about 50 to about 55%. The sweetener may be added in the form of a syrup thereby also serving to add water to the mixture as well as act as a bulking agent. The preferred sweetener is a combination of fructose or high fructose corn syrup present in amounts of about 18% to about 34% by weight, along with additional amounts of sorbitol or sugar.

The flavoring agents are incorporated into the product at about 0.3 to about 2% by weight and preferably about 0.4 to about 1.8% by weight based on the total weight of the food product. The amount of flavoring agent utilized is not critical and is a matter of preference. Similarly, where dry fruit is used as the flavor source the amount used is a matter of preference and can vary from about 5% to about 20% by weight and preferably about 8% to about 15% by weight of the total food product. It is within the scope of this invention to utilize natural fruits and fruit extracts in combination with flavoring agents. Examples of dried fruits useful include, but are not limited to, apples, apricots, peaches, bananas, pineapple, oranges, grapefruit, prunes, raisins and the like.

The instant invention also includes a process of making a food product, having a high dietary fiber content, which is organoleptically pleasing and which is smooth in texture and mouthfeel and free of the fibrous, needle-like quality associated with fiber products.

The process comprises:

(a) preparing a mixture of water, soluble dietary fiber, sweetener and flavors by blending these ingredients at a temperature of about 90° to about 110° C. with agitation for a period sufficient to concentrate the mixture to about 60% to about 80% and preferably about 70% to about 73% of its original weight; the mixture optionally containing a buffer solution to maintain pH stability of the soluble dietary fiber;

(b) adding to the above mixture a separate mixture comprising concentrated insoluble fiber and water and optionally other sweeteners, colors and flavors, whereby the concentrated insoluble is intimately contacted with and thereby coated with the soluble fiber mixture, the total mixture being kept under agitation;

(c) cooling the mixture to about 35° to about 40° C; and (d) forming the mixture into the desired shape for consumption.

The final food products of the instant invention require a certain moisture content to aid in processing as well as to lend a moist and chewy texture. However, the moisture content of the final food product should not be less than about 6% nor greater than about 18% by weight. In products containing a low moisture content, e.g., about 6% by weight, use of higher quantities of fat or other materials which contribute to fluid-like textures are generally included. For example, when the moisture content of the final product is 6%, fat content is added in amounts of about 10%. When the moisture content is high, e.g., about 18%, the fat content is kept low, e.g., about 6%.

In instances where the food product is to contain a fat portion in addition to the required ingredients (e.g. dietary fiber, insoluble dietary fiber, sweetener and flavor), the fat is added at least in the first step of the process and preferably to both steps of the process.

There is no entirely satsifactory way of classifying enzymes. They may, however, be arbitrarily divided into the following groups on the basis of the types of reactions they catalyze.

A large group of intracellular and extracellular enzymes catalyze the breakdown of their respective substrates by simple hydrolysis and are therefore known as hydrolytic enzymes.

Most of the digestive enzymes belong to this class and digestion may be regarded as an organized series of hydrolytic reactions with stepwise degradation of complex food molecules into simpler products. Hydrolytic enzymes may be further subdivided into peptidases, carbohydrases, and esterases. The carbohydrates consist of enzymes such as the alpha ($\alpha$) and beta ($\beta$) amylases, which attack complex carbohydrates, for example, starch or glycogen; and those such as sucrase (intertase) or maltase, which act on simple sugars. They catalyze the hydrolysis of glycosidic linkages.

The preferred enymes are amyloglucosidases, protease and alpha-amylase However, useful enzymes in the instant invention include those which are naturally occurring in the human metabolic system for digesting proteins and carboyhydrates.

The advantanges of the instant invention can be further appreciated by reference to the following examples. These examples are intended to illustrate preferred embodiments and are by no means intended to limit the effective scope of the claims. All percents are by weight of the total composition or food product unless otherwise specified.

EXAMPLE ONE

This example is intended to illustrate the process of making the dietary fiber composition.

A 10 gram sample of corn bran is placed in a beaker with 25 ml of petroleum ether, stirred at room temperature for about 15 minutes and allowed to stand for about one minute. The petroleum ether is decanted off and the solvent wash is repeated two additional times. The defatted bran is then dried.

A phosphate buffer solution, pH 6.0, is prepared and added along with termamyl solution to the defatted fiber. About 50 ml of buffer solution and about 100 micro-liters of termamyl solution are used for every gram of fiber sample. The beaker containing the fiber sample and solutions is placed in boiling water for about 15 minutes, with gentle agitation at 5 minute intervals. The sample is then cooled and the pH adjusted to 7.5±0.1 by adding 10 ml of 0.285N NaOH per gram of sample.

Next, 5 mg of protease per gram of fiber is added to the sample. The sample is incubated at about 60° C. for 30 minutes with continuous agitation and cooled, at which time the pH is adjusted to 4.5±0.2 with phosphoric acid solution. About 10 ml of 0.329M phosphoric acid solution is required per one gram sample of fiber. Next, about 0.3 ml of amyloglucosidase solution is added and the sample is incubated at about 60° C. for about 30 minutes with continuous agitation. The concentrated insoluble fiber was then filtered off and washed.

The concentrated insoluble fiber, now being essentially free of all digestibles, is then coated in a standard mixer with an aqueous solution of pectin. The composition is then dried to remove excess moisture and yield a dry powder material comprising concentrated insoluble dietary fiber coated with soluble dietary fiber.

EXAMPLE TWO

The identical procedure for obtaining concentrated insoluble fiber as in example one was used this time using wheat bran as the fiber source. The purified insoluble fiber was then coated with sodium alginate using fluized bed granulation.

EXAMPLE THREE

The identical procedure as Example One was used for purifying the corn bran. The purified insoluble fiber was then coated with calcium alginate by means of a fluidized bed granulation method.

What is claimed is:

1. A dietary fiber composition comprising an insoluble dietary fiber derived from, grain sources coated or enrobed with a soluble dietary fiber, said insoluble dietary fiber being in the concentrated form and free of digestible components and said soluble dietary fiber being selected from the group consisting of alginates, gums, pectin, mucillages, plant exudates, fermentation products, synthetic hydrocolloids and mixtures thereof and present in an amount sufficient to mask the fibrous, rough mouthfeel texture of the concentrated insoluble dietary fiber.

2. The composition of claim 1 wherein the insoluble dietary fiber is present in amounts of about 92% to about 98.5% based on a dry weight basis of the total composition.

3. The composition of claim 2 wherein the insoluble fiber is derived from a cereal bran.

4. The composition of claim 3 wherein the cereal bran is selected from the group consisting of wheat, corn, barley, rye, oats and mixtures thereof.

5. The composition of claim 1 in solid form.

6. The composition of claim 1 wherein the soluble fiber is a hydrocolloid, film-forming material selected from the group consisting of arabic, tragacanth, karaya, ghatti, agar alginates, carrageenans, fucellan, psyllium and mixtures thereof.

7. The composition of claim 1 wherein the soluble is a hydrocolloid, film-forming material selected from the group consisting of dextran, xanthan, curdan, carboxypropylcellulose, hydroxypropylmethyl cellulose, low methoxy pectin, propylene glycol alginate and mixtures thereof.

8. A process for making a coated or enrobed dietary fiber composition comprising:
(a) preparing an insoluble concentrated dietary fiber free of digestible components by removing the digestible portions of a cereal bran with a solvent to chemically defat the insoluble dietary fiber; and subsequently treating the defatted fiber enzymatically to remove protein and carbohydrates;
(b) recovering the concentrated concentrated insoluble fiber;
(c) coating or enrobing the concentrated insoluble fiber with a soluble dietary fiber using an aqueous medium, said soluble dietary selected from the group consisting of alginates, gums, pectin, mucillages, plant exudates, fermentation products, synthetic hydrocolloids and mixtures thereof and used in an amount sufficient to mask the fibrous, rough mouthfeel texture of the concentrated insoluble dietary fiber;
(d) removing excess water by drying to yield the coated fiber composition.

9. The process of claim 8 wherein the cereal bran is selected from the group consisting of corn, wheat, rye, barley, oats and mixtures thereof.

10. The process of claim 8 wherein the solvent is hexane or petroleum ether.

11. The process of claim 8 wherein the protein and carbohydrates are removed using the enzymes protease, termamyl and amyloglucosidase.

12. The process of claim 8 wherein the soluble dietary fiber coating is a hydrocolloid, film-forming material selected from the group consisting of pectin, alginates, gums, mucillages and mixtures thereof.

13. The process of claim 8 wherein the soluble fiber is a hydrocolloid, film-forming material selected from the group consisting of gum arabic, tragacanth, karaya, ghatti, agar, alginates, carrageenans, fucellan, psyllium, and mixtures thereof.

14. The process of claim 8 wherein the soluble fiber is a hydrocolloid, film-forming material selected from the group consisting of dextran, xanthan, curdan, carboxymethyl cellulose, methylcellulose hydroxypropylcellulose, hydroxypropylmethyl cellulose, low methoxy pectin, propylene glycol alginate and mixtures thereof.

15. The process of claim 12 wherein the coating or enrobing is prepared by fluidized bed granulation or simple mixing.

* * * * *